(12) United States Patent
Taylor et al.

(10) Patent No.: US 10,162,254 B1
(45) Date of Patent: Dec. 25, 2018

(54) COMPACT LIGHT PROJECTION SYSTEM INCLUDING AN ANAMORPHIC REFLECTOR ASSEMBLY

(71) Applicant: Facebook Technologies, LLC, Menlo Park, CA (US)

(72) Inventors: Byron Taylor, Redmond, WA (US); Yijing Fu, Redmond, WA (US); Lu Lu, Seattle, WA (US); Wanli Chi, Sammamish, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/139,971

(22) Filed: Sep. 24, 2018

Related U.S. Application Data

(63) Continuation of application No. 15/886,438, filed on Feb. 1, 2018, now Pat. No. 10,133,168.

(51) Int. Cl.
| | |
|---|---|
| G03B 21/28 | (2006.01) |
| G03B 21/20 | (2006.01) |
| G02B 27/01 | (2006.01) |
| G02B 27/00 | (2006.01) |
| G02B 27/09 | (2006.01) |

(52) U.S. Cl.
CPC ..... *G03B 21/2066* (2013.01); *G02B 27/0025* (2013.01); *G02B 27/0172* (2013.01); *G02B 27/0911* (2013.01); *G03B 21/28* (2013.01)

(58) Field of Classification Search
CPC .... G03B 21/28; G03B 21/147; G03B 21/005; H04N 9/3129; G02B 27/0911; G02B 15/00; G02B 13/08; G02B 2027/011; G02B 2027/0116; G02B 27/017
See application file for complete search history.

(56) References Cited

U.S. PATENT DOCUMENTS 6,022,114 A 2/2000 Foo

*Primary Examiner* — Ryan D Howard
(74) *Attorney, Agent, or Firm* — Fenwick & West LLP

(57) ABSTRACT

A compact light projection system. The light projection system includes a light source, an anamorphic reflector assembly, and a correction element that is configured to mitigate aberration. The light source is configured to emit image light. The anamorphic reflector assembly includes a first surface and a second surface. The first surface is configured to reflect the image light toward the second surface which reflects the reflected image light to output it from the anamorphic reflector assembly. And the first surface and the second surface are both curved and non-rotationally symmetric such that the light output from the anamorphic reflector assembly is collimated image light. The collimated image light is optically corrected based in part on mitigation of aberration by the correction element.

20 Claims, 5 Drawing Sheets

COMPACT LIGHT PROJECTION SYSTEM INCLUDING AN ANAMORPHIC REFLECTOR ASSEMBLY

CROSS REFERENCE TO RELATED APPLICATIONS

This application is a continuation of U.S. application Ser. No. 15/886,438, filed Feb. 1, 2018, which is incorporated by reference in its entirety.

BACKGROUND

The present disclosure generally relates to optical collimators, and specifically relates to a light projection system that includes an anamorphic reflector assembly for artificial reality applications.

Headsets in virtual reality applications typically display image content via some form of display. For virtual reality (VR) applications it is desirable to have a light headset of a small form factor. But, designing a display for such a headset is difficult. In particular, in cases where the headset is something akin to a set of eyeglasses. A projection system in the display generates the image light. However, a combination of space constraints (e.g., very compact), field of view (e.g., wide to facilitate an immersive VR experience), and an external stop location tend to greatly limit optical designs for projectors and have limited conventional headset design.

SUMMARY

A compact light projection system for use in artificial reality systems. The light projection system includes one or more light sources, an anamorphic reflector assembly, and a correction element. The one or more light sources are configured to emit image light and the correction element is configured to mitigate aberration (e.g., chromatic). In some embodiments, the one or more light sources are strip sources. The anamorphic reflector assembly includes a first surface and a second surface. The first surface is configured to reflect the image light toward the second surface which reflects the reflected image light to output it from the anamorphic reflector assembly. And the first surface and the second surface are both curved and non-rotationally symmetric such that the light output from the anamorphic reflector assembly is collimated image light. The collimated image light is optically corrected based in part on mitigation of aberration by the correction element. In some embodiments, the correction element is configured to receive the collimated image light from the anamorphic reflector assembly, and optically correct the collimated image light to form optically corrected light. In other embodiments, the correction element is located elsewhere in the light projection system (e.g., between the light source and the anamorphic reflector assembly).

In some embodiments, the light projection may include a field lens the acts to correct for field curvature, correct for high order field dependent aberration, correct a chief ray angle, correct for chromatic aberration, or some combination thereof. And in some embodiments, the anamorphic reflector assembly is a monolithic optical element, and the correction element may be a Pancharatnam Berry Phase (PBP) lens that is configured to correct for at least chromatic aberration. In some embodiments, the PBP lens may also be curved.

The light projection system may be part of a near-eye display (NED) that is part of an artificial reality system configured to present content via the NED to the user.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
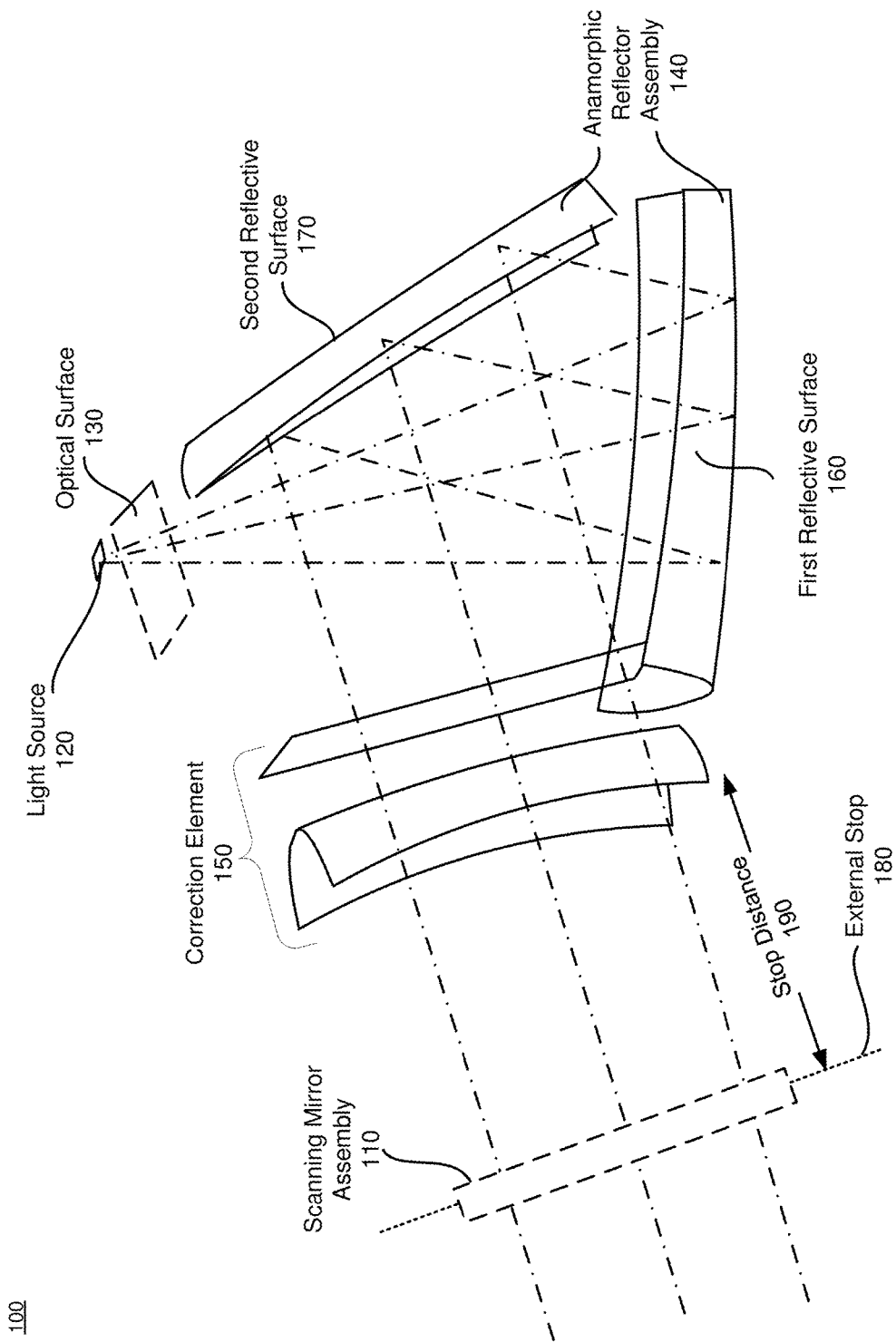
FIG. 1 is a perspective view of a light projection system, in accordance with one or more embodiments.

FIG. 1 is a perspective view of a light projection system 100, in accordance with one or more embodiments. The light projection system 100 provides substantially collimated light to a scanning mirror assembly 110 (e.g., of a near-eye display). The light projection system 100 includes a light source 120, an optical surface 130, an anamorphic reflector assembly 140, and a correction element 150. In alternative configurations, different and/or additional components may be included in the light projection system 100. Likewise in alternative configurations, one or more components may be positioned differently in the light projection system 100.

The light source 120 is one or more strip sources. A strip source is a rectangular array of light emitters. A light emitter is a device that emits light. A light emitter may be, e.g., a light emitting diode (LED), a microLED, a laser diode, some other device that emits light, or some combination thereof. A strip source may be a 1 dimensional array (e.g., 1×1000 pixels) or a 2 dimensional array (e.g., 10×1000 pixels). In some embodiments, the light source 120 is monochromatic. In other embodiments, the light source 120 is polychromatic. For example, in some embodiments, a strip source in the light source 120 may include sub-pixels of different colors (e.g., red, green, and blue). The light source 120 emits in one or more bands of light. The bands of light may include, e.g., visible light and/or infrared light. In some embodiments, the light source 120 includes one or more microlenses. The one or more microlenses are positioned to adjust an orientation of light emitted by the light source 120, and in particular adjust an orientation of a chief ray (also known as a principal ray) of the light projection system 100. The chief ray crosses an optical axis at the locations of pupils of the light projection system 100. In some embodiments each light emitter has a corresponding micro lens. In other embodiments, a single microlens may direct light from a plurality of light emitters, and in some embodiments, a single microlens may direct light for all of the light emitters in the light source 120.

The anamorphic reflector assembly 140 collimates the image light. The anamorphic reflector assembly includes a first reflective surface 160 and a second reflective surface 170. The reflective surfaces 160 and 170 together not only collimate the image light, but also compress the long dimension of the image light—and thus act as an anamorphic optical system. The first reflective surface 160 and the second reflective surface 170 are coated to reflect light in a band emitted by the light source 120. In the embodiment shown in FIG. 1, the first reflective surface 160 and the second reflective surface 170 are two mirrors that are separated by an air gap. In alternate embodiments (not shown) the first reflective surface 160 and the second reflective surface 170 are coated surfaces on a monolithic optical element. Additionally, as a monolithic optical element, the anamorphic reflector assembly 140 also includes an optical surface 130. The optical surface 130 may be shaped to correct for aberration. The monolithic optical element may be composed of, e.g., plastic, glass, or some other material that is transmissive to the image light. In embodiments, where the anamorphic reflector assembly 140 the material of the monolithic optical element is selected such that an index of refraction is within a range of, e.g., 1.4 to 2.8 for visible light, and in embodiments, where the light emitted by the light source 120 is IR light, the range of indices may be higher.

The first reflective surface 160 and the second reflective surface 170 are surfaces that may include, e.g., freeform surface, a Zernike polynomial surface, a Chebychev polynomial surface, some other form of parameterized equation that models an asymmetric surface, some other form of parameterized equation that models a symmetric surface, or some combination thereof.

The correction element 150 is one or more optical elements that are configured to optically correct the collimated image light to form optically corrected light. The optical correction performed by the correction element 150 may be, e.g., to correct for chromatic aberration, correct distortion, correct some other aberration, or some combination thereof. The correction element 150 as illustrated in FIG. 1 is a plurality of optical elements (e.g., a doublet), including at least one curved lens.

Note that in cases where the anamorphic reflector assembly 140 is a monolithic optical element, substantial dispersion may occur as the image light travels through the material of the monolithic optical element. The dispersion causes chromatic aberration. In alternate embodiments (not shown), the correction element 150 is a Pancharatnam Berry Phase (PBP) lens that is configured to correct for at least chromatic aberration. As an Abbe number of a PBP lens has a reverse sign of the monolithic optical element, a PBP lens acts to mitigate chromatic aberration. Moreover, since the Abbe number (e.g., Zeonex E48R has an Abbe number of ~60) of a PBP lens is ~one order of magnitude higher than potential materials of the monolithic optical element (e.g., a typical diffractive has an Abbe number of ~3), a PBP lens with very little optical power can correct color aberration caused by the monolithic optical element that has a lot of optical power relative to the PBP lens. Additionally, in embodiments, where the color correction element 150 is a flat PBP lens, it can actually be placed in other locations in other locations in the light projection system 100. For example, the PBP lens could be placed between the light source 120 and the reflector assembly 140, such that light from the light source 120 passes through the PBP lens prior to being incident on the first reflective surface 160 of the reflector assembly 140. Additionally, as a PBP lens may be formed as a flat structure that takes minimal space, relative to, e.g., a multi-element lens (e.g., a doublet). Accordingly, use of a PBP lens as the correction element 150 may help reduce a form factor of the light projection system 100.

In some embodiments where the where the color correction element 150 is a PBP lens, it is curved in at least one dimension. The PBP lens may have one or more surfaces that are curved in 1 dimension (e.g., cylindrical), or the PBP lens may have one or more surfaces that are curved in 2 dimensions (e.g., spherical, asphericial, freeform, etc.). The PBP is deposited onto a substrate to form the color correction element 150. In some embodiments, the substrate is curved prior to deposition of the PBP. Alternatively, the PBP and substrate is curved after deposition. Additionally, in some embodiments, the substrate may be deposited onto an optical surface of a separate optical element, such that the color correction element 150 is directly coupled to the separate optical element (e.g., thereby reducing a number of separate optical elements in the light projection system 100).

Curvature of the PBP lens can affect its efficiency. The PBP lens includes a surface that receives light from the reflector assembly 140. The curvature of the PBP lens in the color correction element 150 is such that an angle of incidence is within some threshold value. For example, for any given ray of light that is incident at a point on the surface, an angle between the given ray and a normal vector at the point on the surface is at most 3 degrees. By having the curvature of the PBP lens be such that incident light is substantially normal, the PBP lens operates efficiently. In particular, by having the curvature of the PBP lens be less than some threshold value, it ensures, that minimal changes in magnification occur as a function of distance from an optical center of the PBP lens.

The light projection system 100 has an external stop 180 that is remote from the correction element 150. The external stop 180 is a pupil for the light projection system 100. In some embodiments, a diameter of the external stop 180 may be, e.g., at least 0.5 to 5 mm. A stop distance 190 separates the correction element 150 from the external stop 180. In FIG. 1, the scanning mirror assembly 110 is located at the external stop 180. However, in alternate embodiments, other components may be placed at the external stop 180 instead of the scanning mirror assembly 110. For example, an in-coupling area of a waveguide or a fold mirror. It is advantageous to have the stop distance 190 be small, as it, e.g., allows for a compact system. The stop distance 190 may range from, e.g., 0 to 10 mm. In some embodiments, the stop distance 190 is preferably 4 mm. In contrast, in conventional light projection systems, rotationally symmetric optics, large form factor and non-ideal external stop location make them impractical for incorporating into a wearable head-mounted display.

Figure 2:
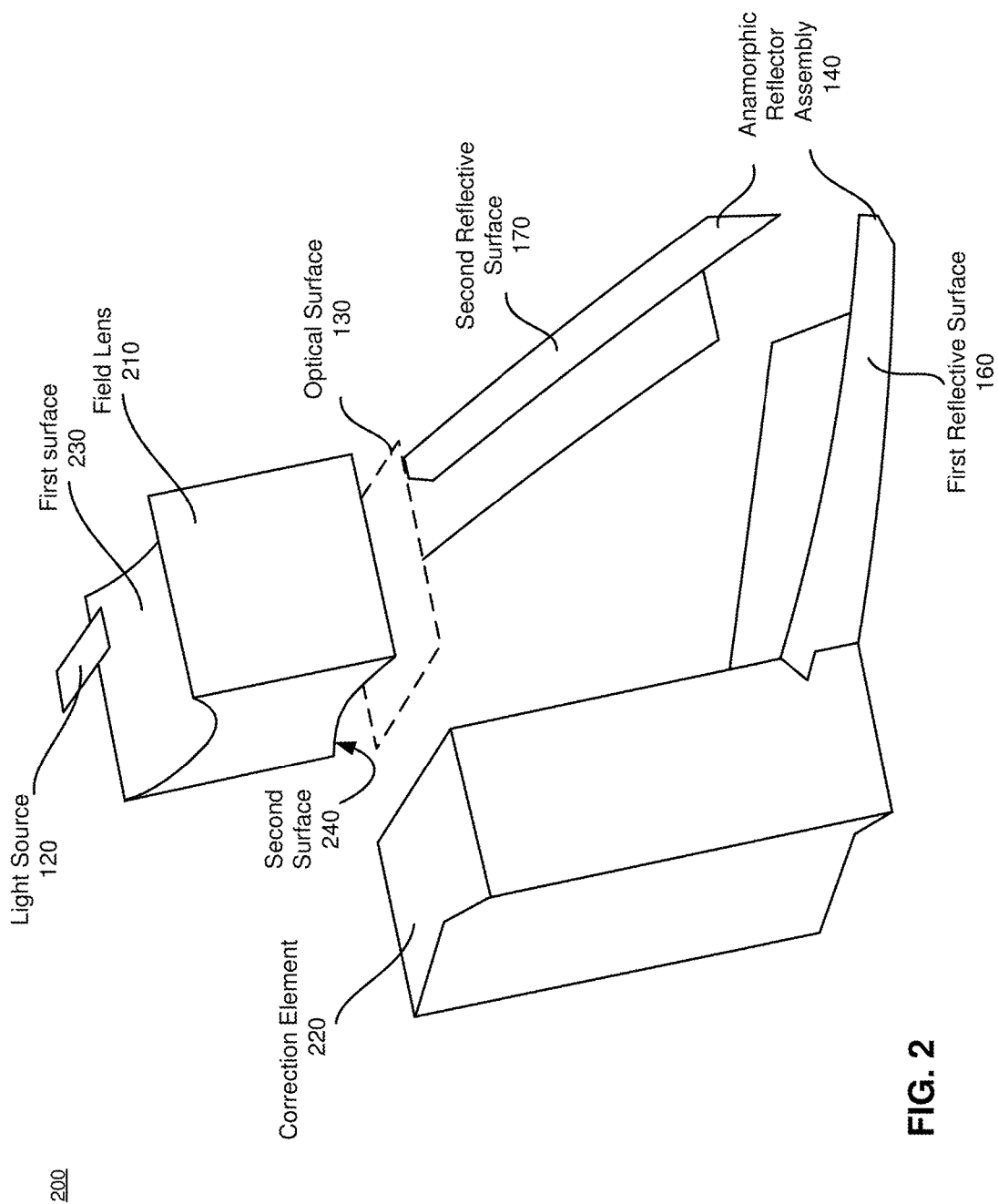
FIG. 2 is a perspective view of a light projection system that includes a field lens, in accordance with one or more embodiments.

FIG. 2 is a perspective view of a light projection system 200 including a field lens 210, in accordance with one or more embodiments. The light projection system 200 is substantially similar to the light projection system 100, except that it includes the field lens 210 and a monolithic correction element 220 that is coupled to the first reflective surface 160.

The field lens 210 is configured to adjust light emitted from the light source 120. In some embodiments, the field lens 210 is configured to adjust light by increasing a narrow axis field of view (i.e., the short axis of a strip source), correct a chief ray angle, correct for chromatic aberration, or some combination thereof. The field lens 210 includes a first surface 230 and a second surface 240 that is opposite the first surface 230. The first surface 230 receives light from the light source 120, and the second surface 240 outputs light after it has been adjusted by the field lens 210. The curvature of the first surface 230 and the second surface 240 are selected based in part on the adjustment the field lens 210 applies to the light emitted from the source 120. The first surface 230 and the second surface 240 may be, e.g., a cylindrically curved surface, a spherical surface, an aspherical surface, a freeform surface, or some combination thereof.

Additionally, in some embodiments, the field lens 210 may include a plurality of optical elements. In some instances the plurality of optical elements may include materials of differing indices of refraction (e.g., selected to correct for chromatic aberration). In some cases the plurality of optical elements may be separated by an air gap. The field lens 210 may be composed of glass, plastic, or some other material that is substantially transparent to light from the light source 120.

Figure 3:
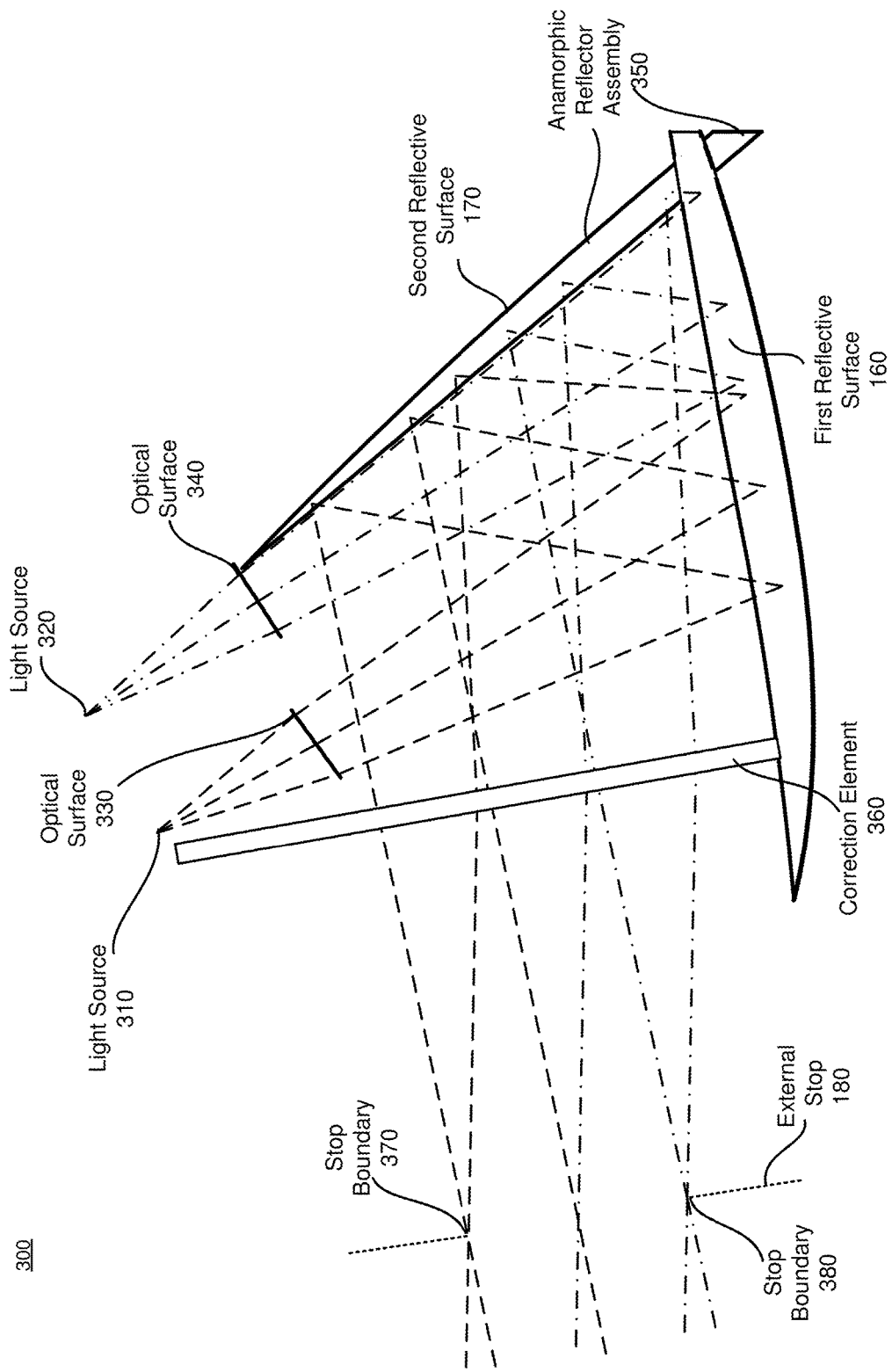
FIG. 3 is a perspective view of a light projection system including multiple light sources, in accordance with one or more embodiments.

FIG. 3 is a perspective view of a light projection system 300 including multiple light sources, in accordance with one or more embodiments. The light projection system 300 is substantially similar to the light projection system 100, except that it includes a plurality of light sources and corresponding optical surfaces. In this embodiment, the light projection system 300 includes a light source 310, a light source 320, an optical surface 330, an optical surface 340, an anamorphic reflector assembly 350, and a correction element 360. The light source 310 and the light source 320 are substantially similar to the light source 120, the optical surface 330 and the optical surface 340 are substantially similar to the optical surface 130, the anamorphic reflector assembly 350 is substantially similar to the anamorphic reflector assembly 140, and the correction element 360 is are substantially similar to the correction element 150.

In alternative configurations, different and/or additional components may be included in the light projection system 300. For example, in some embodiments, the light projection system 300 may include one or more field lenses that adjust light emitted from the light sources 310 and 320. Likewise, in alternative configurations, some components of the light projection system 300 may be located in different positions than those illustrated in FIG. 3. For example, the correction element 360 may be positioned elsewhere in the light projection system 300.

The light source projection system 300 has a field of view that spans the external stop 180. Light emitted from the light source 310 corresponds to a first half of the field of view, and is adjusted by the optical surface 330 and the anamorphic reflector assembly 350 such that it is collimated. The correction element 360 optically corrects the collimated image light to form optically corrected light for the first half of the field of view. In FIG. 3, the first half of the field of view spans a distance from a center of the external stop 180 to a stop boundary 370. Similarly, light emitted from the light source 320 corresponds to a second half of the field of view, and is adjusted by the optical surface 340 and the anamorphic reflector assembly 350 such that it is collimated. The correction element 360 optically corrects the collimated image light to form optically corrected light for the second half of the field of view. In FIG. 3, the second half of the field of view spans a distance from the center of the external stop 180 to a stop boundary 380.

As the light projection system 300 utilizes multiple light sources that each emit light that corresponds to a different portion of the field of view, overall brightness of the light projection system 300 is increased relative to, e.g., a single source light projection system. Additionally, in embodiments where a scanning mirror assembly (e.g., the scanning mirror assembly 150) are located at the external stop 180, a scan angle of the scanning mirror assembly is reduced by half.

Note that while the light projection system 300 includes two light sources 310, 320 and two optical surfaces 330, 340, in alternate embodiments (not shown) the light projection system 300 may include additional light sources and corresponding optical surfaces. For example, the light projection system 300 may be modified to include a third light source and corresponding optical surface such that each light source emits light corresponding to a third of a field of view of the modified light projection system.

Figure 4A:
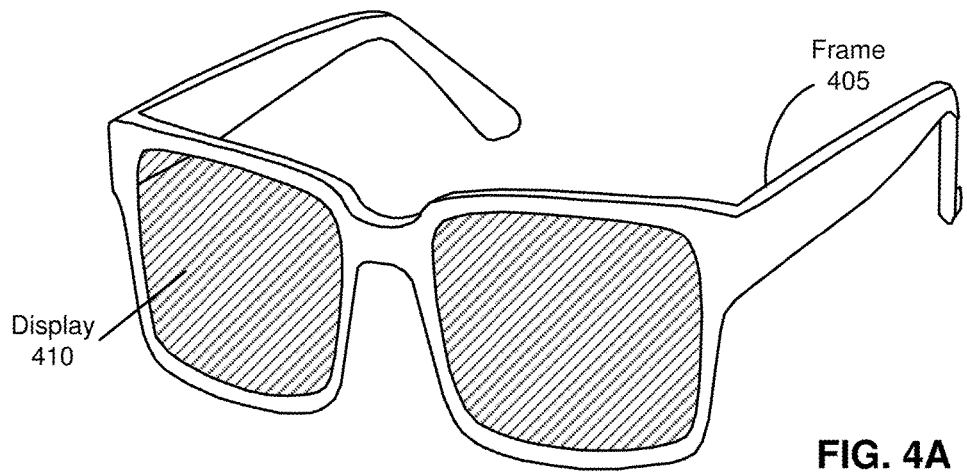
FIG. 4A is a diagram of a near-eye-display (NED), in accordance with an embodiment.

FIG. 4A is a diagram of a near-eye-display (NED) 400, in accordance with an embodiment. In some embodiments, the NED 400 may be referred to as a head-mounted display (HMD). The NED 400 presents media to a user. Examples of media presented by the NED 400 include one or more images, video, audio, or some combination thereof. In some embodiments, audio is presented via an external device (e.g., speakers and/or headphones) that receives audio information from the NED 400, a console (not shown), or both, and presents audio data based on the audio information. The NED 400 is generally configured to operate as an artificial reality NED.

The NED 400 shown in FIG. 1 includes a frame 405 and a display 410. The frame 405 is coupled to one or more optical elements which together display media to users. In some embodiments, the frame 405 may represent a frame of eye-wear glasses. The display 410 is configured for users to see the content presented by the NED 400. As discussed below in conjunction with FIGS. 4B and 5, the display 410 includes at least one display assembly (not shown) for directing one or more image light to an eye of the user. The display assembly includes a waveguide display that includes one of the light projections systems described above with reference to FIGS. 1-3.

Figure 4B:
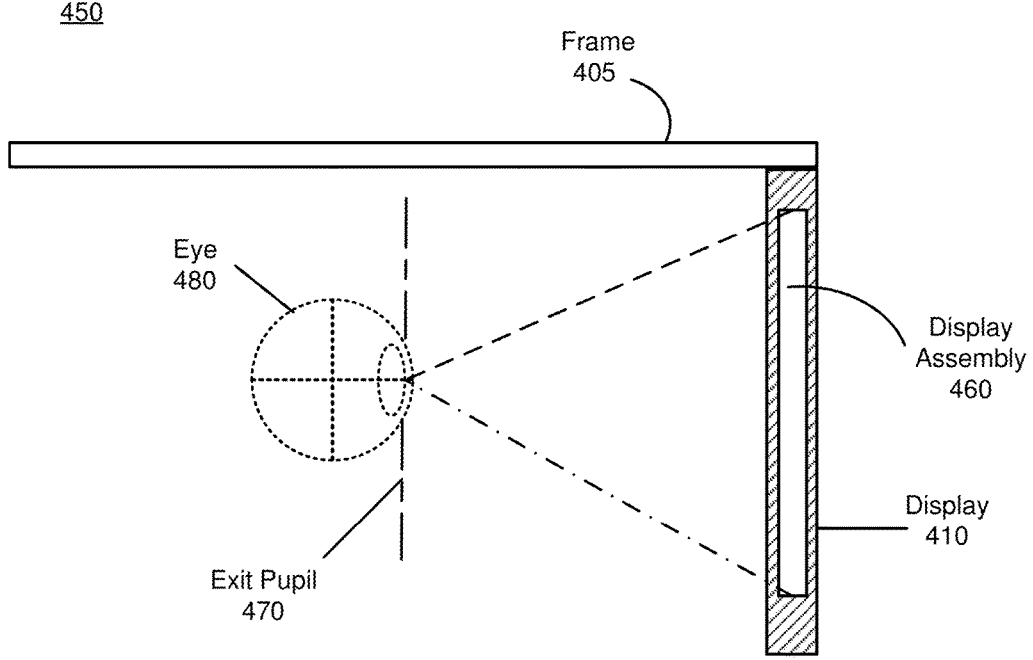
FIG. 4B is a cross-section of the NED illustrated in FIG. 4A, in accordance with an embodiment.

FIG. 4B is a cross-section 450 of the NED 400 illustrated in FIG. 4A, in accordance with an embodiment. The display 410 includes at least one display assembly 460. An exit pupil 470 is a location where an eye 480 is positioned in an eyebox region when the user wears the NED 400. For purposes of illustration, FIG. 4B shows the cross section 450 associated with a single eye 480 and a single display assembly 460, but in alternative embodiments not shown, another display assembly which is separate from the display assembly 460 shown in FIG. 4B, provides image light to an eyebox located at an exit pupil of another eye of the user.

The display assembly 460, as illustrated below in FIG. 4B, is configured to direct the image light to an eyebox located at an exit pupil 470 of the eye 480. The display assembly 460 may be composed of one or more materials (e.g., plastic, glass, etc.) with one or more refractive indices that effectively minimize the weight and widen a field of view (hereinafter abbreviated as 'FOV') of the NED 400.

In some configurations, the NED 400 includes one or more optical elements between the display assembly 460 and the eye 480. The optical elements may act to, e.g., correct aberrations in image light emitted from the display assembly 460, magnify image light emitted from the display assembly 460, some other optical adjustment of image light emitted from the display assembly 460, or some combination thereof. The example for optical elements may include an aperture, a Fresnel lens, a convex lens, a concave lens, a filter, or any other suitable optical element that affects image light.

Figure 5:
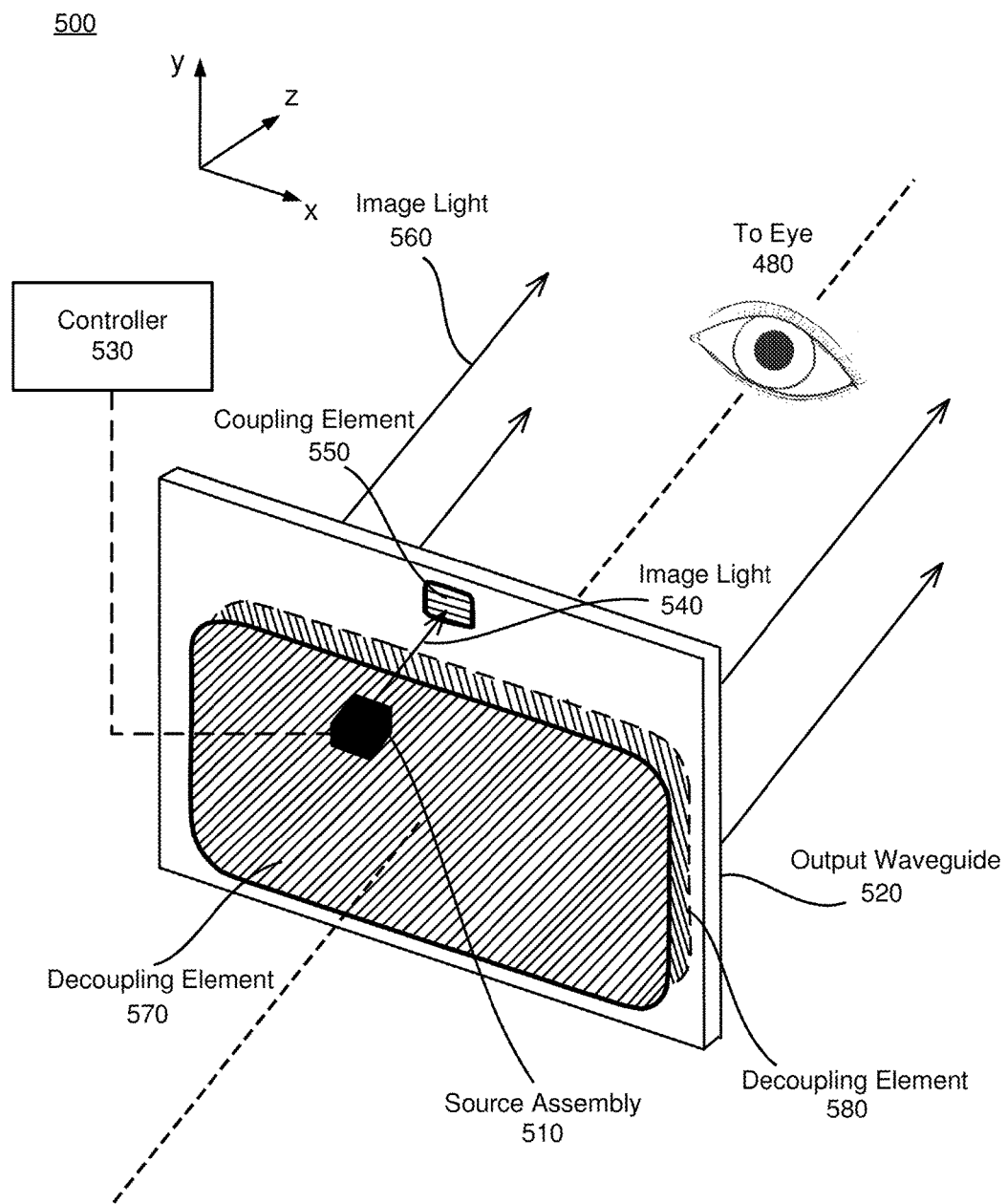
FIG. 5 illustrates an isometric view of a waveguide display with a light projection system, in accordance with an embodiment.

FIG. 5 illustrates an isometric view of a waveguide display 500 with a source assembly 510, in accordance with an embodiment. In some embodiments, the waveguide display 500 is a component (e.g., display assembly 460) of the NED 400. In alternate embodiments, the waveguide display 500 is part of some other NED, or other system that directs display image light to a particular location.

The waveguide display 500 includes a source assembly 510, an output waveguide 520, and a controller 530. For purposes of illustration, FIG. 5 shows the waveguide display 500 associated with a single eye 480, but in some embodiments, another waveguide display separate (or partially separate) from the waveguide display 500, provides image light to another eye of the user. In a partially separate system, one or more components may be shared between waveguide displays for each eye.

The source assembly 510 generates light in accordance with display instructions from the controller 530. The source assembly 510 includes a light projection system, and optionally includes a scanning mirror assembly. The light projection system may be, e.g., the light projection system 100, the light projection system 200, or the light projection system 300. The scanning mirror assembly may be, e.g., the scanning mirror assembly 150. The light projection system emits light in accordance with display instructions received from the controller 530. The source assembly 510 generates and outputs image light 540 to a coupling element 550 of the output waveguide 320.

The output waveguide 520 is an optical waveguide that outputs image light 560 to the eye 480. The output waveguide 520 receives the image light 540 at the coupling element 550, and expands the image light in one or more dimensions and outputs the expanded image light using the decoupling elements 570 and 580 as the image light 560. The coupling element 550 and the decoupling elements 570 and 580 may be, e.g., a diffraction grating, a holographic grating, one or more cascaded reflectors, one or more prismatic surface elements, an array of holographic reflectors, and some combination thereof. An orientation and position of the image light exiting from the output waveguide 520 is controlled by changing an orientation and position of the image light 540 entering the coupling element 550.

The output waveguide 520 may be composed of one or more materials that facilitate total internal reflection of the image light received from the source assembly 510. The output waveguide 520 may be composed of e.g., silicon, plastic, glass, or polymers, or some combination thereof. The output waveguide 520 has a relatively small form factor. For example, the output waveguide 520 may be approximately 50 mm wide along X-dimension, 30 mm long along Y-dimension and 0.5-1 mm thick along Z-dimension.

The controller 530 determines display instructions for the source assembly 510. Display instructions are instructions to render one or more images. In some embodiments, display instructions may simply be an image file (e.g., bitmap). The display instructions may be received from, e.g., a console of an artificial reality system. Display instructions are instructions used by the source assembly 510 to generate image light. The display instructions may include, e.g., a type of a source of image light (e.g. monochromatic, polychromatic), a scanning rate, an orientation of a scanning apparatus, source wavelength, pulse rate, pulse amplitude, beam type (continuous or pulsed), other parameter(s) that affect the emitted light, or some combination thereof. The controller 530 includes a combination of hardware, software, and/or firmware not shown here so as not to obscure other aspects of the disclosure.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:
1. A system comprising:
an anamorphic reflector assembly including a first reflective surface and a second reflective surface of a monolithic optical element, the first reflective surface configured to reflect image light toward the second reflective surface which reflects the reflected image light to output it from the anamorphic reflector assembly, and the first reflective surface and the second reflective surface are both curved and non-rotationally symmetric such that the light output from the anamorphic reflector assembly is collimated image light; and a correction element configured to mitigate chromatic aberration based in part on the correction element having an Abbe number that is opposite in sign to an Abbe number of the monolithic optical element, and wherein the collimated image light is optically corrected based in part on mitigation of chromatic aberration by the correction element.

2. The system of claim 1, wherein the correction element is a Pancharatnam Berry Phase (PBP) liquid crystal lens.

3. The system of claim 2, wherein the PBP liquid crystal lens receives image light from the anamorphic reflector assembly.

4. The system of claim 2, wherein the PBP liquid crystal lens includes at least one curved surface curved in 1-dimension.

5. The system of claim 2, wherein the PBP liquid crystal lens includes at least one curved surface curved in 2-dimensions.

6. The system of claim 2, wherein the anamorphic reflector assembly receives the image light from the PBP liquid crystal lens.

7. The system of claim 2, wherein the PBP liquid crystal lens is flat.

8. The system of claim 2, wherein the PBP liquid crystal lens includes a first surface and a second surface, and the PBP liquid crystal lens is curved such that for any given ray of the optically corrected light that is incident at a point on the first surface, an angle between the given ray and a normal vector at the point on the first surface is at most 3 degrees.

9. The system of claim 1, wherein the Abbe number of the correction element is an order of magnitude larger than the Abbe number of the monolithic optical element.

10. The system of claim 1, wherein the image light is a visible band of light.

11. The system of claim 1, wherein the image light is emitted by a strip source.

12. The system of claim 11, wherein the strip source is selected from a group consisting of: a linear array of micro-light emitting diodes, and a linear array of vertical cavity emitting lasers.

13. The system of claim 1, wherein the correction element receives image light from the anamorphic reflector assembly, and the system has an external stop at a stop distance from the correction element.

14. The system of claim 13, further comprising a scanning mirror configured to scan the optically corrected light in at least one dimension, the scanning mirror placed at a location of the external stop.

15. The system of claim 13, wherein the stop distance is at most 10 mm.

16. The system of claim 1, further comprising a field lens positioned between the anamorphic reflector assembly and a light source that emits the image light, such that the image light from the light source passes through the field lens prior to entering the anamorphic reflector assembly, and the field lens is configured to perform at least one of: increase a field of view, correct a chief ray angle, and correct chromatic aberration.

17. The system of claim 1, wherein the image light is emitted by a light source that includes a first strip source and a second strip source.

18. The system of claim 17, wherein the system has a field of view that spans an external stop, and light emitted from the first strip source corresponds to a first portion of the field of view, and light emitted from the second strip source corresponds to a second portion of the field of view that is different than the first portion.

19. The system of claim 18, wherein the field of view is divided into a first half and a second half, and the first portion corresponds to the first half and the second portion corresponds to the second half.

20. The system of claim 1, wherein the system is part of a waveguide display that is part of a near-eye device.

* * * * *